United States Patent
Houston et al.

(10) Patent No.: US 10,038,382 B2
(45) Date of Patent: Jul. 31, 2018

(54) CURRENT MODE 3-STATE BUCK-BOOST PWM CONTROL ARCHITECTURE

(71) Applicant: Intersil Americas LLC, Milpitas, CA (US)

(72) Inventors: M. Jason Houston, Cary, NC (US); Eric M. Solie, Durham, NC (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 15/402,048

(22) Filed: Jan. 9, 2017

(65) Prior Publication Data

US 2017/0207703 A1    Jul. 20, 2017

Related U.S. Application Data

(60) Provisional application No. 62/280,577, filed on Jan. 19, 2016, provisional application No. 62/335,523, filed on May 12, 2016, provisional application No. 62/339,497, filed on May 20, 2016.

(51) Int. Cl.
*H02M 3/158*    (2006.01)
*H02M 3/157*    (2006.01)
*H02M 3/156*    (2006.01)

(52) U.S. Cl.
CPC .......... *H02M 3/1582* (2013.01); *H02M 3/156* (2013.01); *H02M 3/157* (2013.01); *H02M 3/158* (2013.01)

(58) Field of Classification Search
CPC .. H02M 3/158; H02M 3/1588; H02M 3/1582; H02M 3/156; H02M 3/155; H02M 3/157; H02M 3/1563; H02M 3/1584

USPC ........ 323/234, 247, 259, 271, 318, 328, 344
See application file for complete search history.

(56) References Cited

U.S. PATENT DOCUMENTS

| | | | | |
|---|---|---|---|---|
| 6,788,033 | B2 * | 9/2004 | Vinciarelli | H02M 3/1582 323/225 |
| 2009/0108823 | A1 * | 4/2009 | Ho | H02M 3/1582 323/282 |
| 2014/0217996 | A1 * | 8/2014 | Peker | H02M 3/1582 323/271 |
| 2014/0268890 | A1 * | 9/2014 | Xie | H02M 3/1582 363/16 |

* cited by examiner

*Primary Examiner* — Timothy J Dole
*Assistant Examiner* — Bryan R Perez
(74) *Attorney, Agent, or Firm* — Foley & Lardner LLP

(57) ABSTRACT

A voltage regulator including a converter and a modulator. The converter includes a switching circuit coupled to an inductor for converting an input voltage to an output voltage. The modulator controls the switching circuit in a buck mode of operation, a boost mode of operation, and an intermediate buck-boost mode of operation. During the buck-boost mode of operation, the modulator controls the switching circuit during each switching cycle to sequentially switch between three different switching states, including a first switching state that applies the input voltage across the inductor, a second switching state that applies a difference between the input and output voltages across the inductor, and a third switching state that applies the output voltage across the inductor. The modulator is controlled based on voltage applied across or current flowing through the inductor to regulate the output voltage to a target level.

8 Claims, 6 Drawing Sheets

CURRENT MODE 3-STATE BUCK-BOOST PWM CONTROL ARCHITECTURE

CROSS-REFERENCE TO RELATED APPLICATIONS

This application claims the benefit of U.S. Provisional Application Ser. No. 62/280,577, filed on Jan. 19, 2016, U.S. Provisional Application Ser. No. 62/335,523, filed on May 12, 2016 and U.S. Provisional Application Ser. No. 62/339,497, filed on May 20, 2016, which are hereby incorporated by reference in their entireties for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Voltage regulators that convert an input voltage to a regulated output voltage operate in buck mode when the input voltage is greater than the output voltage, and operate in boost mode when the input voltage is less than the output voltage. When the input voltage may range from less than to greater than the output voltage, the voltage regulator must support both modes and must switch between the modes. Also, many configurations support an intermediate buck-boost mode. The buck-boost mode may be a 2-state configuration based on a single pulse width modulation (PWM) signal. The 2-state configuration during the buck-boost mode generally operates at a higher inductor current thereby reducing overall efficiency.

A current mode 3-State buck-boost pulse width modulation (PWM) control architecture as described herein provides high efficiency and fast transient response during the intermediate buck-boost mode of operation.

Figure 1:
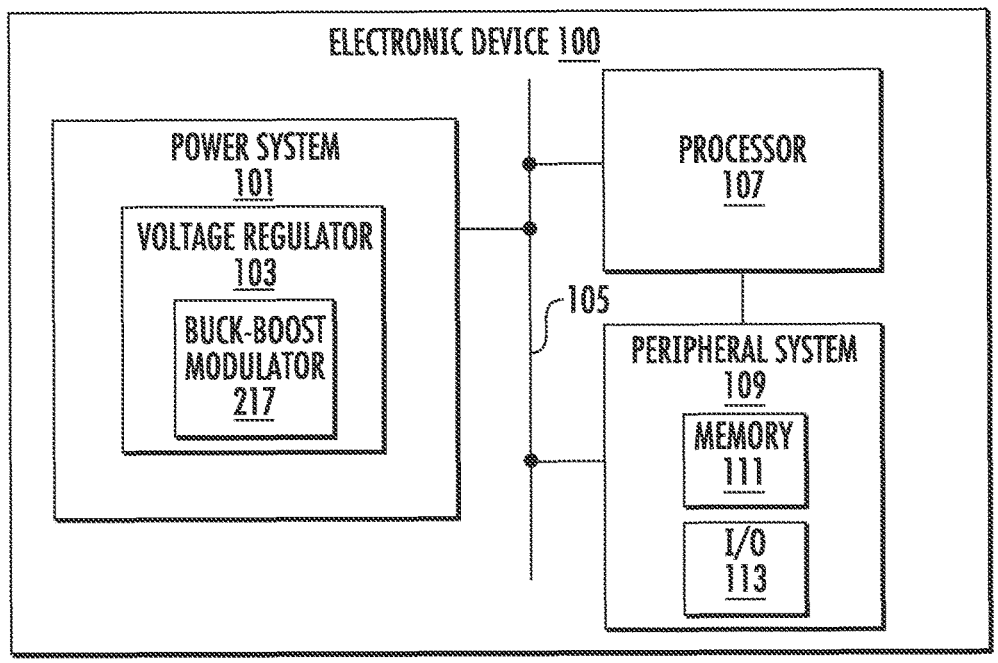
FIG. 1 is a simplified block diagram of an electronic device configured with a power system with a voltage regulator including a buck-boost modulator implemented according to an embodiment of the present invention.

FIG. 1 is a simplified block diagram of an electronic device 100 configured with a power system 101 with a voltage regulator 103 including a buck-boost modulator 217 implemented according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a supply bus 105, which includes any combination of power and/or signal conductors. In the illustrated embodiment, the peripheral system 109 may include any combination of a system memory 111, such as any combination of random-access memory (RAM) and/or read-only memory (ROM) type devices and memory controllers and the like, and an input/output (I/O) system 113, which may include system and peripheral controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other types of electronic devices (e.g., media player, recording device, etc.).

Figure 2:
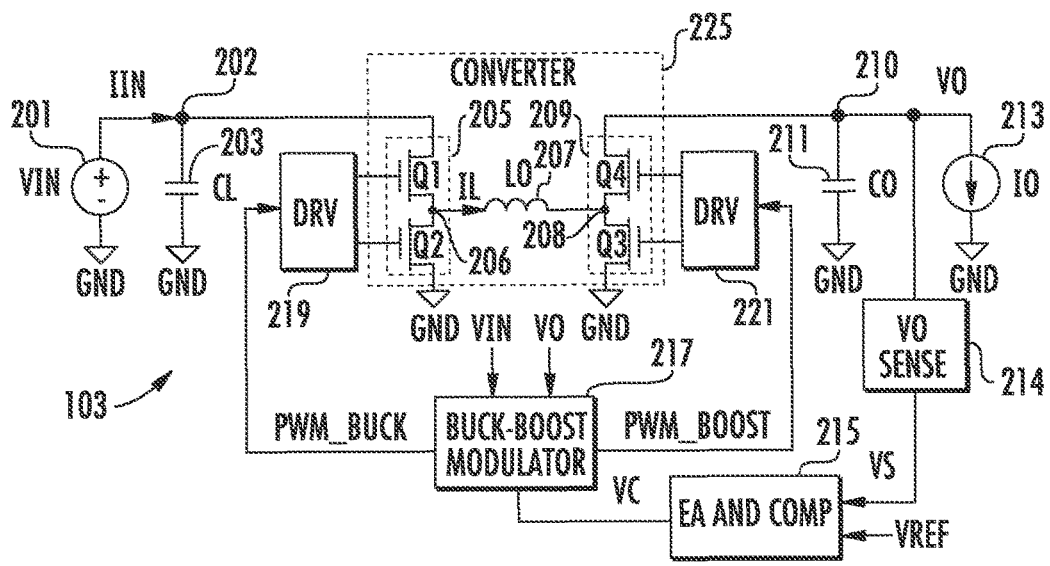
FIG. 2 is a simplified schematic and block diagram of the voltage regulator of FIG. 1 according to one embodiment configured for buck, boost and buck-boost operation.

FIG. 2 is a simplified schematic and block diagram of the voltage regulator 103 according to one embodiment configured for buck, boost and buck-boost operation. An input source 201 is coupled between an input node 202 and a reference source voltage node. The reference source voltage node develops a reference source voltage, which may have any positive, zero, or negative voltage level. In the illustrated embodiment, the reference source voltage is ground (GND) but may be referenced by other names, such as VSS or the like. The input source 201 develops an input voltage VIN on the input node 202 and sources an input current IIN. The input source 201 may be implemented as an AC-DC adapter and/or a battery in which a battery charger or the like may also be included. An input capacitor 203 with capacitance CI is coupled between the input node 202 and GND. A buck power stage 205 is coupled between the input node 202 and GND. The buck power stage 205 includes a first electronic switch Q1 having current terminals coupled between the input node 202 and a first intermediate node 206, and a second electronic switch Q2 having current terminals coupled between node 206 and GND. An inductor 207 with inductance LO is coupled between the first intermediate node 206 and a second intermediate node 208. An inductor current IL is shown flowing from node 206 to node 208 through the inductor 207. A boost power stage 209 is coupled between an output node 210 and GND in which the output node develops an output voltage VO. The boost power stage 209 includes a first electronic switch Q4 having current terminals coupled between the output node 210 and the second intermediate node 208, and a second electronic switch Q3 having current terminals coupled between node 208 and GND.

An output capacitor 211 with capacitance CO and a load 213 drawing an output load current IO are both coupled between the output node 210 and GND. The load 213 may represent any combination of the system devices drawing load current, such as the processor 107, the system memory 111, the peripheral system 109, etc. The output voltage VO is provided through a VO sense block 214 to provide an output voltage sense signal VS provided to an input of an error amplifier and compensation (EA AND COMP) block 215. The VO sense block 214 may simply be a buffer or conductor or the like in which VS has the same voltage level as VO. Alternatively, or additionally, the VO sense block 214 may include a voltage divider or the like in which the voltage level of VS follows VO at a proportional level. In either event, VS represents VO as a sensed version thereof. The error amplifier and compensation block 215 also receives a reference voltage VREF at another input, and provides a compensation or control voltage VC at its output. VREF has a voltage level indicative of a target level of VO in which the control loop operates to keep VS at about the level of VREF. VC is provided to an input of the buck-boost modulator 217, which also receives or detects the input voltage VIN and the output voltage VO. The buck-boost modulator 217 has a first output providing a first pulse control signal PWM_BUCK to a first driver (DRV) 219 for driving the gates of Q1 and Q2, and has a second output providing a second pulse control signal PWM_BOOST to a second driver 221 for driving the gates of Q3 and Q4.

Each of the drivers 219 and 221 are configured to convert the corresponding pulse control or PWM signal (PWM_BUCK or PWM_BOOST) into the gate drive signals for turning on and off the corresponding switches Q1 and Q2 or Q3 and Q4. As an example, in a buck mode of operation, the PWM_BOOST signal may be held at a fixed value to keep Q4 on and Q3 off so that the output end of the inductor 207 remains coupled to the output node 210. During the buck mode of operation, when PWM_BUCK is at one state (e.g., high), the driver 219 turns on Q1 and turns off Q2, and when PWM_BUCK is at another or opposite state (e.g., low), the driver 219 turns off Q1 and turns on Q2. The driver 219 may be configured to ensure that Q1 and Q2 are not turned on at the same time. In the boost mode of operation, PWM_BUCK may be held high so that Q1 remains on and Q2 remains off, and PWM_BOOST toggles during successive cycles so that the driver 221 toggles activation of Q3 and Q4 in similar manner to effectuate boost operation. For example, when PWM_BOOST is high, Q4 is turned on while Q3 is turned off, and when PWM_BOOST goes low, Q4 is turned off and Q3 is turned on. The driver 221 may also be configured to ensure that Q3 and Q4 are not turned on at the same time.

The error amplifier and compensation block 215 drives VC based on a difference between VS (representative of VO) and VREF. As an example, an error amplifier (not shown) may have a first input receiving VS and a second input receiving VREF and an output providing VC. A compensation circuit, such as a resistor-capacitor (RC) circuit or the like, may be included to provide loop compensation as understood by those of ordinary skill in the art. The voltage regulator 103 is configured as a hysteretic current mode buck-boost PWM control system as controlled by the buck-boost modulator 217 as further described herein.

The electronic switches Q1-Q4 are each shown as MOS or FET type transistors, such as a P-type MOS (PMOS) or P-type FET (PFET) transistor, an N-type MOS (NMOS) or P-type FET (PFET) transistor, or a MOSFET transistor or the like. Alternative power switching devices or electronic control switches are contemplated, such as bipolar junction transistors (BJTs) and the like, insulated-gate bipolar transistors (IGBTs) and the like, etc. Each switch device is sized and configured to perform the intended function. The switches Q1-Q4 and the inductor 207 are collectively part of a converter 225 that is controlled by the buck-boost modulator 217 to convert the input voltage VIN to the output voltage VO.

The voltage regulator 103 is shown in simplified form in which many details are omitted as not relevant for a complete understanding of the present invention. Also, the present disclosure is directed towards operation in the intermediate buck-boost mode of operation rather than the buck mode or the boost mode. The buck-boost modulator 217 determines the mode of operation and generates the PWM_BUCK and PWM_BOOST signals accordingly based on the mode of operation. As previously described, during the buck mode when VIN is greater than VO, the PWM_BOOST signal may be held high to turn Q4 on and Q3 off while PWM_BUCK oscillates to toggle activation of Q1 and Q2. Similarly, during the boost mode when VIN is less than VO, the PWM_BUCK signal may be held high to turn Q1 on and Q2 off while PWM_BOOST oscillates to toggle activation of Q3 and Q4. In one embodiment, the determination of the mode of operation is made by comparing VIN with VO. Although VO may be varied in some embodiments, VO is typically regulated to a predetermined target voltage level as determined by the voltage level of VREF. VIN, on the other hand, may have a relatively wide range from below VO to above VO. When VIN and VO are separated from each other by a significant amount, then one of the buck or boost operating modes is selected. When VIN is relatively close to VO, such as within a predetermined percentage of VO (e.g., 12%), then the buck-boost operating mode is selected.

A conventional configuration uses a 2-state buck-boost operation in which operation toggles between two states during each PWM cycle. In the first switching state, Q1 and Q3 are turned on while Q2 and Q4 are turned off. As shown by the voltage regulator 103, when Q1 and Q3 are turned on, VIN is applied to a first end of the inductor 207 at node 206 and GND is applied to the second end at node 208. The inductor current IL ramps up during the first switching state. In the second switching state of the 2-state buck-boost configuration, Q2 and Q4 are turned on while Q1 and Q3 are turned off. When Q2 and Q4 are turned on, VO is applied to the second end of the inductor 207 at node 208 and GND is applied to the first end at node 206. The inductor current IL ramps down during the second switching state since the voltage applied across the inductor 207 is effectively reversed. In other words, the voltage VIN is applied in the first state and the voltage –VO is applied in the second state. Operation toggles between these two states during each switching cycle in the conventional 2-state buck-boost configuration.

In the 3-state buck-boost operation as described herein, an intermediate state is interposed between the first and second switching states of the conventional configuration for each switching cycle. The first switching state of the 3-state buck-boost configuration, referred to as the switching state S1, is similar to that of the conventional configuration in which Q1 and Q3 are turned on while Q2 and Q4 are turned off so that the voltage VIN is applied across the inductor 207 and the inductor current IL ramps up. The second switching state of the 3-state buck-boost configuration as described herein, however, is different from that of the conventional 2-state buck-boost configuration. In the second switching state, referred to as the switching state S2, Q1 and Q4 are turned on while Q2 and Q3 are turned off so that VIN is applied to the first end of the inductor 207 at node 206 and VO is applied to the second end of the inductor 207 at node 208. In this manner, the voltage VIN–VO is applied across the inductor 207, which is the difference between the input and output voltages. Since VIN and VO are relatively close or even about equal to each other, the inductor current IL flattens when VIN=VO, or slowly ramps up when VIN>VO, or slowly ramps down when VIN<VO. The third state of 3-state buck-boost configuration, referred to as S3, is similar to the second state of the conventional 2-state configuration, in which Q2 and Q4 are turned on while Q1 and Q3 are turned off. In the third switching state S3 of the 3-state buck-boost configuration as described herein, the voltage −VO is applied across the inductor 207 so that the inductor current IL ramps back down.

The decision for switching between the three switching states S1, S2 and S3 during each switching cycle is further described herein. In contrast to the conventional configuration, 3-state buck-boost operation adds the intermediate second state by introducing a controlled delay on the falling edge of a PWM signal to force an intermediate VIN-VO state between the VIN (S1) and −VO (S3) states. Since the inductor 207 is connected to the output voltage VO for a longer period of time for the 3-state configuration in each cycle, the average inductor current is much lower and efficiency is improved. The intermediate switching state S2 may be a programmable percentage of the overall switching period (K*ts), in which "K" is a programmable gain constant and an asterisk "*" denotes multiplication. The 3-state control scheme ensures fast transient response and current-mode stability.

Figure 3:
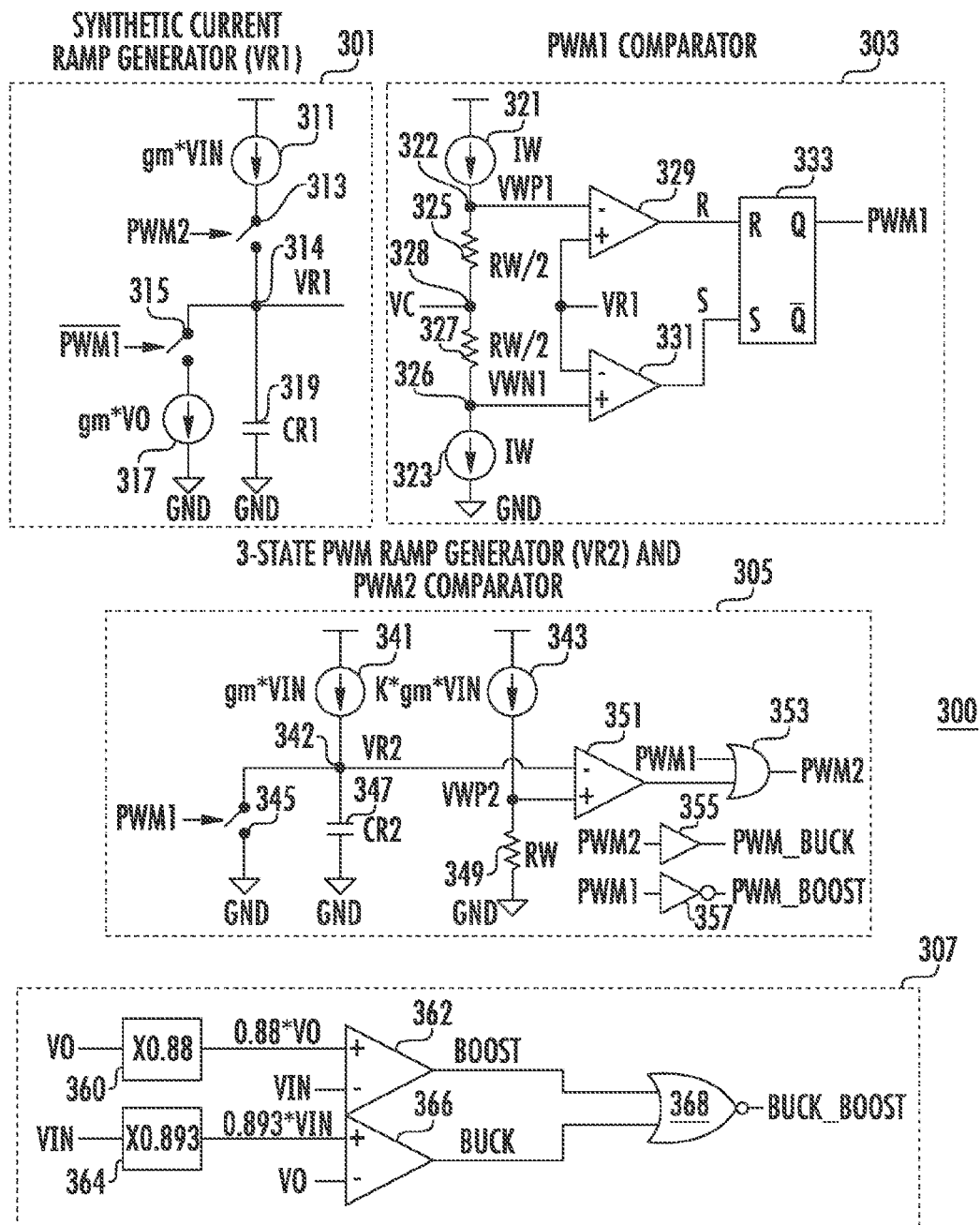
FIG. 3 is a schematic diagram of a buck-boost modulator according to one embodiment which may be used as the buck-boost modulator of FIG. 2.

FIG. 3 is a schematic diagram of a buck-boost modulator 300 according to one embodiment which may be used as the buck-boost modulator 217. The buck-boost modulator 300 includes a synthetic current ramp generator 301, a PWM comparator 303, a ramp generator and PWM comparator 305 and a mode comparator 307. The synthetic current ramp generator 301 includes a current source 311, switches 313 and 315, a current sink 317 and a ramp capacitor 319 having a capacitance CR1. The current source 311 an the switch 313 are coupled in series between a source voltage (e.g., VDD) and a ramp node 314 developing a ramp voltage VR1. The switch 315 and the current sink 317 are coupled in series between the ramp node 314 and GND. The ramp capacitor 319 is coupled between the ramp node 314 and GND.

The current source 311 sources a current gm*VIN to a ramp node 314 to charge the ramp capacitor 319 when the switch 313 is closed by a signal PWM2. The current sink 317 selectively pulls a current gm*VO from the ramp node 314 to GND to discharge the ramp capacitor 319 when the switch 315 is closed by a signal PWM1. The signal PWM1 is an inverted version of a signal PWM1. The current gm*VIN is proportional to the input voltage VIN by a gain factor gm, and the current gm*VO is proportional to the output voltage VO by the gain factor gm. The gain factor gm is a transconductance gain factor, in which the current source 311 and current sink 317 may each be implemented by a transconductance amplifier or the like.

In operation of the synthetic current ramp generator 301, when PWM2 is asserted high to close switch 313 and PWM1 is asserted low (PWM1 asserted high) to open switch 315, then the capacitor 319 is charged with the current gm*VIN to ramp VR1 up proportional to the input voltage VIN. When PWM2 is asserted low to open the switch 313 and PWM1 is asserted high (PWM1 asserted low) to close switch 315, then the capacitor 319 is discharged with the current gm*VO to ramp VR1 down proportional to the output voltage VO (thus VR1 ramps down with −VO). When PWM2 and PWM1 are both asserted high, then VR1 ramps proportional to VIN−VO.

The PWM comparator 303 includes window current sources 321 and 323 each developing a window current IW, window resistors 325 and 327 each having a resistance RW/2 (each half of a window resistance RW), comparators 329 and 331, and a set-reset (SR) latch 333. The current sources 321 and 323 and the window resistors 325 and 327 are coupled in series between a source voltage (e.g., VDD) and GND having a center node 328 receiving the control voltage VC. The window resistor 325 is coupled between the center node 328 and an upper window node 322 which develops an upper window voltage VWP1 provided to the negative input (or inverting input) of the comparator 329. The window resistor 327 is coupled between node 328 and a lower window node 326 which develops a lower window voltage VWN1 provided to the positive input (or non-inverting input) of the comparator 331. As VC varies based on load conditions and other operating conditions, VWP1 and VWN1 follow above and below, respectively, the voltage of VC. Since the resistances (RW/2) of the resistors 325 and 327 and the currents (IW) of the current sources 321 and 323 are about equal, VWP1 remains above VC by a half a window voltage VW, or VW/2, whereas VWN1 remains VW/2 below the voltage of VC and the window voltage VW=VWP1−VWN1. VR1 is provided to the positive input of the comparator 329 and to the negative input of the comparator 331. The output of the comparator 329 provides a reset signal R to a reset input of the SR latch 333. The output of the comparator 331 provides a set signal S to the set input of the SR latch 333. The Q output of the SR latch 333 asserts the PWM1 signal.

In operation of the PWM comparator 303, when VR1 falls at or just below the voltage of VWN1, the comparator 331 asserts the S signal to set the SR latch 333 to assert PWM1 high. When VR1 rises to or just above the voltage of VWP1, the comparator 329 asserts the R signal to reset the SR latch 333 to assert PWM1 low. As noted previously, the PWM1 signal is an inverted version of PWM1 for controlling the switch 315.

The ramp generator and PWM comparator 305 includes current sources 341 and 343, a switch 345 controlled by the PWM1 signal, a capacitor 347 with capacitance CR2 coupled between another ramp node 342 and GND, a resistor 349 with resistance RW, a comparator 351 and a 2-input Boolean logic OR gate 353. The ramp node 342 is provided to the negative input of the comparator 351. The ramp generator and PWM comparator 305 may also include a buffer 355 and an inverter 357. In one embodiment, the capacitance CR2 is the same as CR1, or CR1=CR2. The output of the current source 343 is coupled to one end of the resistor 349, having its other end coupled to GND. The current source 343 develops a current gm*VIN*K through the resistor 349 developing a voltage VWP2 provided to the positive input of the comparator 351. Thus, the voltage VWP2 is proportional to the input voltage VIN by the gain factor gm*K. The current source 341 develops the current gm*VIN provided to the ramp node 342 to charge the ramp capacitor 347 when the switch 345 is open. The voltage of the capacitor 347 is the voltage of the ramp node 342, which is shown as a second ramp voltage VR2. The switch 345 is coupled between node 342 and GND. When the switch 345 is closed, the capacitor 347 is shorted to GND so that VR2 is pulled to GND. The output of the comparator 351 is provided to a first input of the OR gate 353, which receives PMW1 at its other input and which provides the PWM2 signal at its output.

In operation of the ramp generator and PWM comparator 305, when PWM1 is asserted high by the PWM comparator 303, the PWM2 signal is also asserted high by the OR gate 353. Also, the switch 345 is closed so that VR2 is pulled lower than VWP2 so that the comparator 351 asserts its output high. When PWM1 goes low, PWM2 remains high since the output of the comparator 351 is still high. Also, when PWM1 goes low the switch 345 is opened so that the capacitor 347 is charged by the current source 341 at a rate proportional to the input voltage VIN. When VR2 rises to or just above VWP2, the comparator 351 asserts its output low so that the OR gate 353 pulls PWM2 low. When PWM1 next goes high, PWM2 is also pulled high by the OR gate 353 and operation repeats in this manner in successive cycles. The buffer 355 receives PWM2 at its input and provides PWM_BUCK at its output, so that the PWM_BUCK signal may be a buffered version of PWM2. Alternatively, PWM2 may be used directly as the PWM_BUCK signal. The inverter 357 receives PWM1 at its input and provides PWM_BOOST at its output, so that PWM_BOOST is an inverted version of PWM1.

The mode comparator 307 receives the input and output voltages VIN and VO and determines the mode of operation between the buck operating mode (BUCK), the boost operating mode (BOOST), or the buck-boost operating mode (BUCK_BOOST). In the illustrated embodiment, the transition between operating modes occurs when VIN is within about 12% of VO. VO is provided to the input of a first gain block 360 that outputs a voltage 0.88*VO that is about 12% less than VO, in which 0.88*VO is provided to the positive input of a boost comparator 362. The boost comparator 362 receives VIN at its negative input and outputs a logic signal BOOST. BOOST is high indicating the boost operating mode when VIN is less than about 88% the voltage level of VO, but is otherwise low. VIN is provided to the input of a second gain block 364 that outputs a voltage 0.893*VIN that is about 12% greater than VO. It is noted that when VIN is about 12% higher than VO, that VO is about 89.3% of VIN (1/1.12≈0.893). The value 0.893*VIN is provided to the positive input of a boost comparator 366, which receives VO at its negative input and outputs a logic signal BUCK. BUCK is high indicating the buck operating mode when VO is less than about 89.3% of the voltage level of VIN, but it otherwise asserted low. The BOOST and BUCK logic signals are provided to a BOOLEAN logic NOR gate 368, which outputs a BUCK_BOOST logic signal indicating the buck-boost operating mode when asserted high. Generally, when VIN is within about 12% of VO, then BUCK and BOOST are both low so that BUCK_BOOST is high indicating the buck-boost operating mode. If either BUCK or BOOST is asserted high, then BUCK_BOOST is low.

Figure 4:
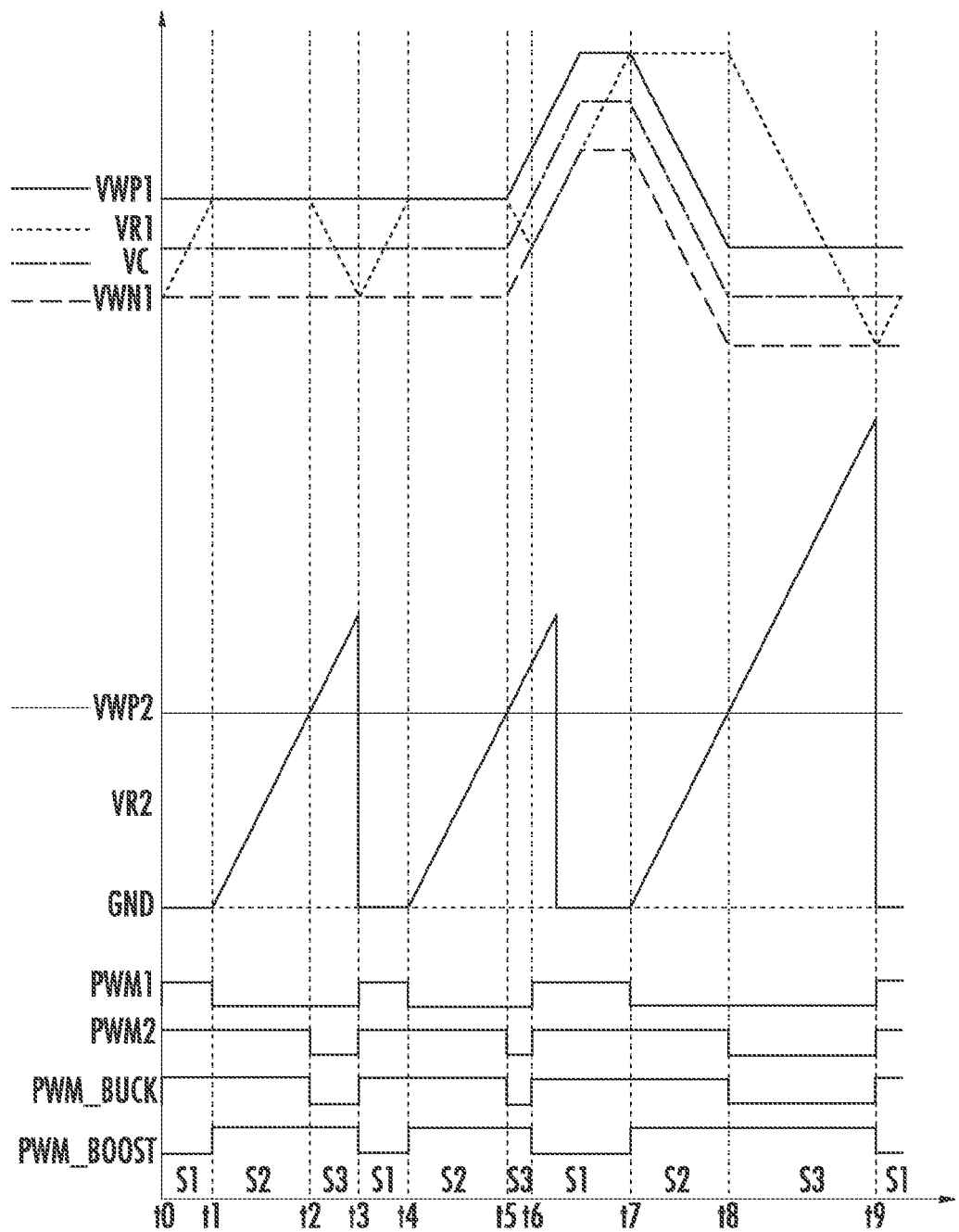
FIG. 4 is a series of timing diagrams illustrating operation of the buck-boost modulator of FIG. 3 according to one embodiment when used within the buck-boost modulator of FIG. 2 during the buck-boost operating mode.

FIG. 4 is a series of timing diagrams illustrating operation of the buck-boost modulator 300 according to one embodiment when used within the buck-boost modulator 217 of FIG. 2 during the buck-boost operating mode. An upper timing diagram plots the voltages VWP1, VWN1, VR1 and VC together versus time. A middle timing diagram plots the voltages VR2 and VWP2 together versus time. A lower timing diagram plots PWM1, PWM2, and corresponding PWM signals PWM_BUCK and PWM_BOOST versus time. The pulse control signals PWM1 and PWM2 generally define the switching state in which the buck-boost modulator 300 sequentially transitions between the states S1-S3 as shown. The PWM_BUCK and PWM_BOOST signals are used to control switching of the buck power stage 205 and the boost power stage 209, respectively, of the converter 225. PWM_BUCK is shown having the same states and state transitions as PWM2, and PWM_BOOST is shown as an inverted version of PWM1. At an initial time t0, PWM1 and PWM2 both go high initiating the first switching state S1. At next time t2, PWM1 goes low so that the switching state transitions from S1 to S2. When PWM2 next goes low at time t2, the switching state transitions from S2 to S3. When PWM1 and PWM2 both go high at subsequent time t3, the switching state transitions from S3 back to S1. Operation repeats in this manner.

As shown in FIG. 4, VWP1 remains at a constant half window voltage above VC, and WWN1 remains at a constant half window voltage below VC. VC is shown at a steady value until it rises in response to a load transient, and then falls in response to a release of the load transient. VWP1 and VWN1 remain displaced from VC based on the window voltage as shown. PWM1 and PWM2 are both asserted high at time t0 initiating the switching state S1, so that and VR1 rises from VWN1 towards VWP1. VR1 rises proportional to the input voltage VIN. When VR1 reaches VWP1 at time t1, PWM1 is pulled low transitioning the switching state to S2, VR1 flattens and ramps proportional to VIN−VO, and VR2 begins ramping from GND towards VWP2 during the switching state S2. VR1 is shown at a flat rate while ramping proportional to VIN−VO, which occurs when VIN and VO are relative close to each other, where it is understood that the slope of ramping is based on the difference between VIN and VO. PWM2 remains high while VR2 is less than VWP2. When VR2 reaches VWP2 at time t2, PWM2 is pulled back low transitioning the switching state to S3, and VR1 ramps down proportional to −VO during switching state S3. Since PWM1 is still low, VR2 continues to ramp up. When VR1 falls to (or just below) VWN1 at time t3, PWM1 and PWM2 are both asserted high again transitioning the switching state back to S1, VR2 is shorted back to GND, and VR1 begins ramping back up once again from VWN1 towards VWP1 during the switching state S1 between times t3 and t4. When VR1 reaches VWP1 at time t4, operation transitions to switching state S2, and when VR2 reaches VWP2 at time t5, operation transitions to switching state S3.

During operation, VC rises in response to a load transient, stays high for a period, and then goes back low in response to release of the load transient. In the simplified illustration, VC starts to rise just as VR2 reaches VWP2 at time t5, where it is understood that VC may start to rise at any asynchronous time during the cycle. Also, when VC rises, VWN1 and VWP1 rise accordingly as controlled by the window circuit (current sources 321 and 323 and resistors 322 and 327). When VR2 reaches VWP2 at time t5, PWM2 goes low and VR1 begins ramping down while VR2 continues to rise during the switching state S3. When VR1 falls to VWN1 (which is still rising) at time t6, PWM1 and PWM2 both go high and operation transitions back to switching state S1. VR1 rises at a rate proportional to VIN (not necessarily the same rate as VC or VWN1), and VR2 is clamped low to GND during S1. When VR1 reaches VWP1 at time t7, PWM1 goes low to transition to switching state S2, so that VR1 ramps proportional to VIN−VO and VR2 is released to ramp up at a rate proportional to VIN. When VR2 eventually reaches VWP2 at time t8, PWM2 is pulled low to transition to the switching state S3, so that VR1 ramps down proportional to −VO while VR2 continues to rise during S3. At this time, VC and VWN1 have both ramped down to a relatively low level. Thus, VR1 ramps from a relatively high state all the way to VWN1 while VR2 continues to rise. When VR1 eventually falls to VWN1 at time t9, PMW1 and PMW2 both go high again to transition to the switching state S1, and operation repeats in this manner during the buck-boost mode of operation.

The PWM_BUCK signal essentially follows PWM2, meaning that they may be the same signal or PWM_BUCK may be a buffered version of PWM2. The PWM_BOOST essentially follows as the PWM1, meaning that they may be the same signal or PWM_BOOST may be a buffered version of PWM1 or an inverted version of PWM1. One observation of the operation shown in FIG. 4 is that when VC falls lower, such as in response to a release of the load transient, VR1 stays relatively high while VR2 ramps up past VWP2. VR2 continues to ramp up while VR1 ramps down, so that the cycle does not end until VR1 reaches VWN1. As described further below, it is possible to shorten this portion of the extended cycle.

Figure 5:
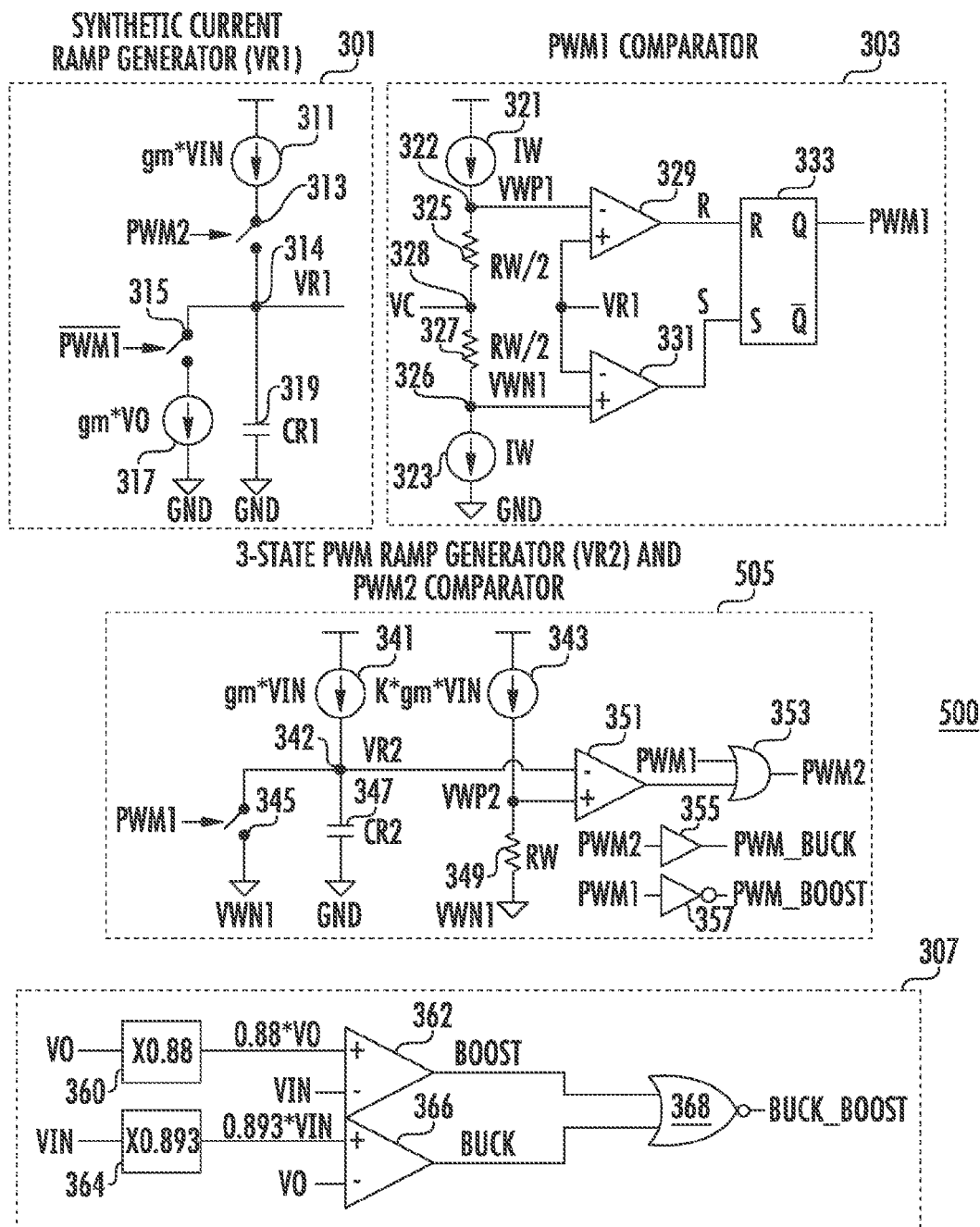
FIG. 5 is a schematic diagram of a buck-boost modulator according to another embodiment which may also be used as the buck-boost modulator of FIG. 2.

FIG. 5 is a schematic diagram of a buck-boost modulator 500 according to another embodiment which may also be used as the buck-boost modulator 217. The buck-boost modulator 500 is substantially similar to the buck-boost modulator 300, and includes the synthetic current ramp generator 301, the PWM comparator 303 and the mode comparator 307 that are each configured to operate in substantially the same manner. The ramp generator and PWM comparator 305, however, is replaced by a similar ramp generator and PWM comparator 505. The ramp generator and PWM comparator 505 also includes the same components coupled in substantially the same manner, namely, the current sources 341 and 343, the switch 345 controlled by the PWM1 signal, the capacitor 347 coupled between the ramp node 342 and GND, the resistor 349 with resistance RW, the comparator 351, the OR gate 353, the buffer 355 and the inverter 357.

For the ramp generator and PWM comparator 505, however, the switch 345 is not coupled and referenced to GND, but instead is coupled and referenced to the VWN1 voltage (lower window voltage). Also, the resistor 349 is not coupled and referenced to GND, but instead is coupled and referenced to the VWN1 voltage. In this manner, the voltages VR2 and VWP2 are not referenced to GND but are instead referenced to VWN1 and thus follow the control voltage VC. When the switch 345 is closed, the capacitor 347 is not shorted to GND but is instead pulled to the voltage level of VWN1. The voltage of VWP2 is the voltage of VWN1 plus a voltage proportional to VIN by operation of the current source 343 sourcing the current gm*VIN*K through the resistor 349 with resistance RW.

Figure 6:
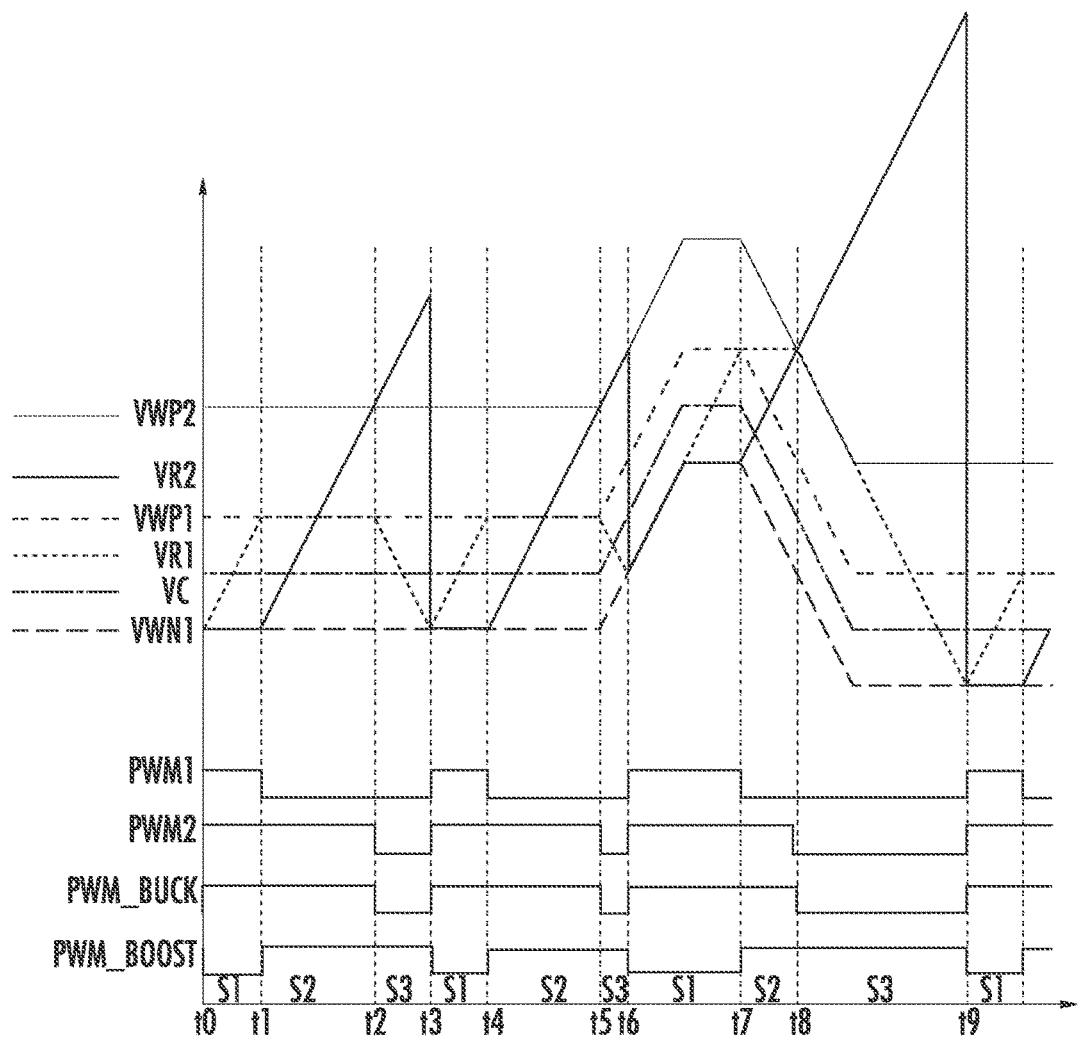
FIG. 6 is a series of timing diagrams illustrating operation of the buck-boost modulator of FIG. 5 according to one embodiment when used within the buck-boost modulator of FIG. 2 during the buck-boost operating mode.

FIG. 6 is a series of timing diagrams illustrating operation of the buck-boost modulator 500 according to one embodiment when used within the buck-boost modulator 217 of FIG. 2 during the buck-boost operating mode. An upper timing diagram plots the voltages VWP1, VWN1, VR1, VC, VR2 and VWP2 together versus time. In this case, VR2 and VWP2 are plotted with the other voltages since biased relative to VWN1. A lower timing diagram plots PWM1, PWM2, and corresponding PWM signals PWM_BUCK and PWM_BOOST versus time. Again, the PWM_BUCK and PWM_BOOST signals are used to control switching of the buck power stage 205 and the boost power stage 209, respectively, of the converter 225, and the pulse control signals PWM1 and PWM2 generally define the switching state in which the buck-boost modulator 500 also sequentially transitions between the states S1-S3 as shown.

As shown in FIG. 6, just as with that shown in FIG. 4, VWP1 remains at a constant half window voltage above VC, and WWN1 remains at a constant half window voltage below VC. VC is shown at a steady value until it rises in response to a load transient at time t5, and then falls in response to a release of the load transient beginning at about time t7. VWP1 and VWN1 remain displaced from VC based on the window voltage as shown. Operation is substantially similar to that shown in FIG. 4 before application of the load transient from time t0 to time t5, except that VR2 is reference to VWN1 rather than GND, and VWP2 changes with changes of VWN1 (and thus with VC). When VR2 reaches VWP2 at time t5 causing the switching state to transition from S2 to S3, VC ramps up in response to the load transient.

Operation is similar when VC rises in response to application of the load transient, except that VWP2 rises with VC during the switching state S3, and when VR1 falls to VWN1 at time t6 transition the switching state to S1, VR2 falls back to VWN1. In this simplified example, VR2 reaches VWP2 at about the same time VC begins rising. In this case, when PWM1 and PWM2 are asserted at time t6, VR2 falls back to VWN1, and then rises with VWN1 since clamped to VWN1 during the switching state S1. When VC flattens after reaching a peak level, VWN1 also flattens along with VR2 which is effectively clamped to VWN1 at this time. VR1 continues to rise until it reaches VWP1 at time t7, and then PWM1 is pulled low to transition to the switching state S2. At about the same time in the simplified illustration, VC, VWN1 and VWP1 begin falling back low in response to release of the transient. However, VR2 begins ramping up at time t7 in response to PWM1 going low, while VR1 ramps proportional to VIN−VO during S2. When VR2 rises above VWP2 (which is ramping down) at time t8, PWM2 goes low to transition to switching state S3 so that VR1 begins ramping down at a rate proportional to −VO. As compared to that shown in FIG. 4, VR1 ramps down sooner in the cycle. VR2 continues to rise while VR1 is ramping down, until VR1 falls back to VWN1 at time t9 to cause transition to switching state S1, at which time VR2 is pulled back to the voltage level of VWN1 and PWM1 and PM2 are asserted high to begin the next switching cycle. Operation repeats in similar manner.

Figure 7:
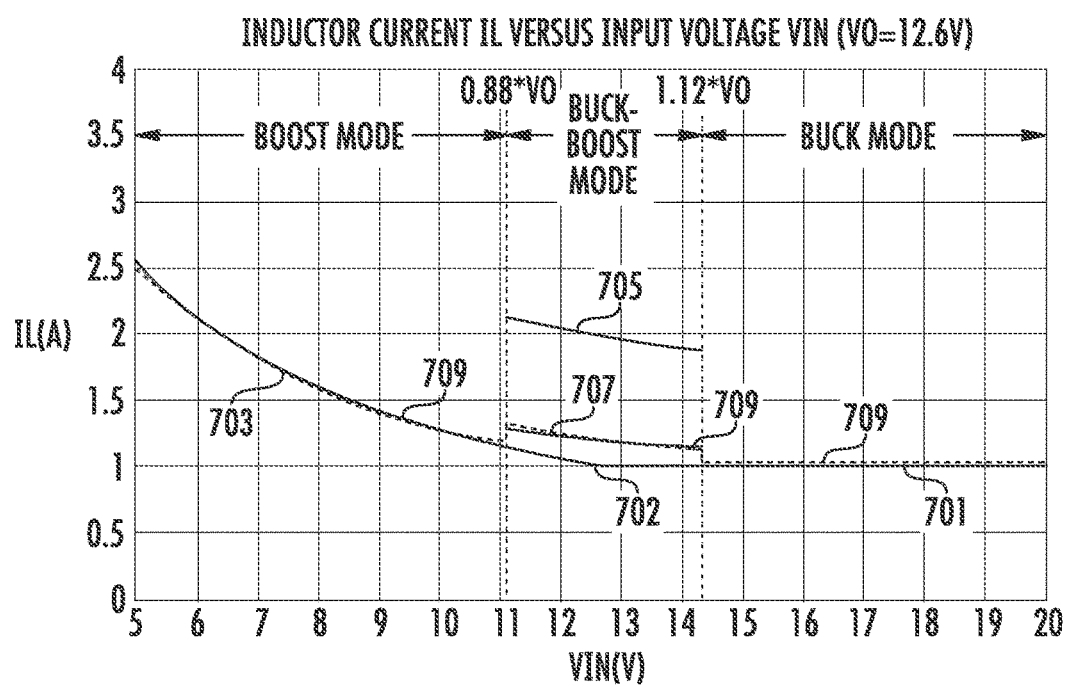
FIG. 7 is a timing diagram illustrating 2-state and 3-state configurations for the buck-boost mode according to embodiments

FIG. 7 is a timing diagram plotting the inductor current IL, in Amperes (A), versus the input voltage VIN in Volts (V) for the 2-state and 3-state configurations for the buck-boost mode, with K=0.5 and VO=12.6V. A buck curve 701 is shown for the input voltage VIN above the output voltage VO with IL at about 1 A, and a boost curve 703 is shown for VIN below VO in which IL rises as VIN falls below VO. The curves 701 and 703 are shown intersecting at a point 702 when VIN=VO=12.6V. Ideally, operation would follow the curves 701 and 703 for minimized inductor current IL. Regulation operation, however, has proved to be rather difficult when VIN is sufficiently close to VO and it is difficult to transition between the buck and boost modes of operation when VIN and VO are about equal. Instead, when VIN is about 14.3V (1.12*VO) or greater, then operation is in the buck operating mode in which the inductor current IL is generally defined by the buck curve 701, which is about 1 A. When the input voltage VIN is about 11.1V (0.88*VO) or less, then operation is in the boost operating mode in which the inductor current is generally defined by the boost curve 703, which ranges from about 1.2 A to 2.5V (for VIN=5V) during the boost mode of operation. When VIN is above about 0.88*VO or below about 1.12*VO, then operation is in the buck-boost operating mode.

A 2-state buck-boost curve 705 is shown applicable during the buck-boost operating mode, in which it ranges from about 1.8 A (at the boost mode transition) to about 2.2 A (at the buck mode transition). Also, a 3-state buck-boost curve 707 is shown applicable during the buck-boost operating mode, in which it ranges from about 1.2 A (at the boost mode transition) to about 1.4 A (at the buck mode transition).

In this manner, the 3-state buck-boost curve 707 remains at about 1 A less than the 2-state buck-boost curve 705 during the buck-boost operating range. A dotted line 709 indicates the system operating curve over the entire range of operation for the buck, buck-boost and boost modes of operation for the 3-state configuration using the buck-boost modulators 300 or 500 as the buck-boost modulator 217 in the voltage regulator 103 for the particular implementation. In this manner, the efficiency of operation of the voltage regulator 103 is substantially improved since the inductor current IL is significantly reduced during the buck-boost operating mode.

The benefits, features, and advantages of the present invention are now better understood with regard to the foregoing description and accompanying drawings. The foregoing description was presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A voltage regulator, comprising:
   a converter comprising a switching circuit coupled to an inductor for converting an input voltage to an output voltage;
   a modulator that controls said switching circuit in a buck mode of operation, a boost mode of operation, and an intermediate buck-boost mode of operation, wherein during said buck-boost mode of operation, said modulator controls said switching circuit during each switching cycle to sequentially switch between three different switching states, comprising:
      a first switching state that applies said input voltage across said inductor;
      a second switching state that applies a difference between said input and output voltages across said inductor; and
      a third switching state that applies said output voltage across said inductor, wherein the modulator controls a duration of the second switching state by generating a time delay at the end of the first switching state; and
   an error amplifier circuit that develops a modulation control voltage based on comparing a voltage indicative of said output voltage with an output reference indicative of a target level of said output voltage;
   wherein said switching circuit further comprises:
      a buck power stage that selectively couples a first end of said inductor either to said input voltage or to a reference source voltage as controlled by a buck pulse control signal; and
      a boost power stage that selectively couples a second end of said inductor either to said output voltage or to said reference source voltage as controlled by a boost pulse control signal;
   wherein said modulator uses said input voltage, said output voltage and said modulation control voltage to generate said buck pulse control signal and said boost pulse control signal; and
   wherein said modulator comprises:
      a ramp generator that develops a ramp control voltage based on said input voltage, said output voltage, a first pulse control signal and a second pulse control signal;
      a comparator circuit that compares said modulation control voltage with said ramp control voltage for developing said first pulse control signal;
      a controlled delay circuit that develops said second pulse control signal based on said first pulse control signal by transitioning said second pulse control signal to a first state when said first pulse control signal is transitioned to said first state, and by transitioning said second pulse control signal to a second state after a programmed delay period after said first pulse control signal has transitioned to said second state; and
      a pulse control system that develops said buck pulse control signal as a buffered version of said second pulse control signal and that develops said boost pulse control signal as an inverted version of said first pulse control signal.

2. The voltage regulator of claim 1, wherein said ramp generator develops said ramp control voltage by discharging a ramp capacitor by a current proportional to said output voltage in response to said first pulse control signal, and that charges said ramp capacitor by a current proportional to said input voltage in response to said second pulse control signal.

3. The voltage regulator of claim 1, wherein said controlled delay circuit comprises:
   a ramp capacitor coupled between a ramp node and the reference source voltage;
   a first current source that sources a first current proportional to said input voltage to said ramp node;
   a switch that shorts said ramp node to said reference source voltage while said first pulse control signal is in said first state;
   a second current source that sources a second current proportional to said input voltage by a gain factor through a resistor referenced to said reference source voltage to develop a compare voltage;
   a comparator that compares voltage of said ramp node with said compare voltage and that provides a first control signal indicative thereof; and
   a logic OR gate that receives said first control signal and said first pulse control signal and that provides said second pulse control signal.

4. The voltage regulator of claim 1, wherein:
   said comparator circuit comprises:
      a window circuit that develops upper and lower window voltages above and below said modulation control voltage; and
      a pulse comparator that compares said ramp control voltage with said upper and lower window voltages for developing said first pulse control signal; and
   wherein said timing circuit comprises:
      a ramp capacitor coupled between a ramp node and said reference source voltage;
      a first current source that sources a first current proportional to said input voltage to said ramp node;

a switch that shorts said ramp node to said lower window voltage while said first pulse control signal is in said first state;

a second current source that sources a second current proportional to said input voltage by a gain factor through a resistor referenced to said lower window voltage to develop a compare voltage;

a comparator that compares voltage of said ramp node with said compare voltage and that provides a first control signal indicative thereof; and a logic OR gate that receives said first control signal and said first pulse control signal and that provides said second pulse control signal.

5. A method of converting an input voltage to an output voltage comprising:

operating a converter with an inductor in a selected one of a buck operating mode, a boost operating mode, and a buck-boost operating mode;

during the buck-boost operating mode for each switching cycle, operating the converter to sequentially switch between first, second and third switching states, comprising:

applying the input voltage across the inductor during the first switching state;

applying a difference between the input and output voltages across the inductor during the second switching state;

controlling a duration of the second switching state by generating a time delay at the end of the first switching state; and applying the output voltage across the inductor during the third switching state;

providing a modulation control voltage based on comparing a voltage indicative of the output voltage with an output reference voltage indicative of a target level of the output voltage;

developing a ramp control voltage based on the input voltage, the output voltage, a first pulse control signal and a second pulse control signal;

comparing the modulation control voltage with the ramp control voltage for developing the first pulse control signal;

developing the second pulse control signal based on the first pulse control signal by transitioning the second pulse control signal to a first state when the first pulse control signal is transitioned to the first state, and by transitioning the second pulse control signal to a second state after a programmed delay period after the first pulse control signal has transitioned to the second state;

selectively coupling a first end of the inductor either to the input voltage or to a reference source voltage based on the second pulse control signal; and selectively coupling a second end of the inductor either to the output voltage or to the reference source voltage based on the first pulse control signal.

6. The method of claim 5, wherein said developing a ramp control voltage comprises:

discharging a ramp capacitor by a current proportional to the output voltage in response to the first pulse control signal; and charging the ramp capacitor by a current proportional to the input voltage in response to the second pulse control signal.

7. The method of claim 5, wherein said developing the second pulse control signal based on the first pulse control signal comprises:

charging a ramp capacitor referenced to the reference source voltage with a first current proportional to the input voltage;

shorting the ramp capacitor to the reference source voltage while the first pulse control signal is in said first state;

developing a compare voltage by applying a second current proportional to the input voltage by a gain factor through a resistor referenced to the reference source voltage;

comparing the voltage of the ramp capacitor with the compare voltage and providing a first control signal indicative thereof; and providing the second pulse control signal by logically OR'ing the first control signal and the first pulse control signal.

8. The method of claim 5, wherein:

said comparing the modulation control voltage with the ramp control voltage comprises:

developing upper and lower window voltages above and below the modulation control voltage; and comparing the ramp control voltage with the upper and lower window voltages for developing the first pulse control signal; and wherein said developing the second pulse control signal based on the first pulse control signal comprises:

charging a ramp capacitor referenced to the reference source voltage with a first current proportional to the input voltage;

shorting the ramp capacitor to the lower window voltage while the first pulse control signal is in said first state;

developing a compare voltage by applying a second current proportional to the input voltage by a gain factor through a resistor referenced to the lower window voltage;

comparing the voltage of the ramp capacitor with the compare voltage and providing a first control signal indicative thereof; and providing the second pulse control signal by logically OR'ing the first control signal and the first pulse control signal.

* * * * *